US012597654B2

(12) United States Patent
Lee et al.

(10) Patent No.: US 12,597,654 B2
(45) Date of Patent: Apr. 7, 2026

(54) BATTERY MODULE HAVING BENT TRAP PORTION AND BATTERY PACK INCLUDING THE SAME

(71) Applicant: LG ENERGY SOLUTION, LTD., Seoul (KR)

(72) Inventors: Young Seok Lee, Daejeon (KR); In Jae Gang, Daejeon (KR); Dae Hoon Lim, Daejeon (KR); Young Bum Cho, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 580 days.

(21) Appl. No.: 18/013,650

(22) PCT Filed: May 24, 2022

(86) PCT No.: PCT/KR2022/007369
§ 371 (c)(1),
(2) Date: Dec. 29, 2022

(87) PCT Pub. No.: WO2022/265246
PCT Pub. Date: Dec. 22, 2022

(65) Prior Publication Data
US 2023/0361383 A1 Nov. 9, 2023

(30) Foreign Application Priority Data
Jun. 15, 2021 (KR) ........................ 10-2021-0077377

(51) Int. Cl.
*H01M 10/6566* (2014.01)
*H01M 10/613* (2014.01)
(Continued)

(52) U.S. Cl.
CPC ..... *H01M 10/6566* (2015.04); *H01M 10/613* (2015.04); *H01M 10/6556* (2015.04); *H01M 50/505* (2021.01)

(58) Field of Classification Search
None
See application file for complete search history.

(56) References Cited

U.S. PATENT DOCUMENTS 11,811,040 B2 * 11/2023 Seo ...................... H01M 50/211
2007/0031728 A1 * 2/2007 Lee ................... H01M 10/6566
429/120
(Continued)

FOREIGN PATENT DOCUMENTS

DE      10 2021 100 659 A1     3/2021
EP             3 890 056 A1    10/2021
(Continued)

OTHER PUBLICATIONS

International Search Report (PCT/ISA/210) issued in PCT/KR2022/007369, dated Sep. 1, 2022.
(Continued)

*Primary Examiner* — Kevin M Bernatz
(74) *Attorney, Agent, or Firm* — Birch, Stewart, Kolasch & Birch, LLP

(57) ABSTRACT
A battery module includes a plurality of battery cells, a busbar configured to electrically connect the plurality of battery cells to each other, and a module case configured to receive the plurality of battery cells and the busbar, wherein the module case includes a receiving portion configured to define a predetermined space, a first trap portion configured to introduce air, a second trap portion configured to discharge air, and an air flow channel portion configured to allow the introduced air to move therealong, and a battery pack including the same.

17 Claims, 3 Drawing Sheets

(51) Int. Cl.
　　H01M 10/6556　　　(2014.01)
　　H01M 50/505　　　(2021.01)

(56)　　　　　References Cited

U.S. PATENT DOCUMENTS

| | | | | |
|---|---|---|---|---|
| 2007/0231678 | A1* | 10/2007 | Park | H01M 10/647 |
| | | | | 429/62 |
| 2008/0003495 | A1* | 1/2008 | Shimizu | H01M 10/651 |
| | | | | 429/120 |
| 2008/0026284 | A1* | 1/2008 | Fujii | H01M 10/613 |
| | | | | 429/120 |
| 2009/0191452 | A1* | 7/2009 | Anantharaman | H01M 10/613 |
| | | | | 429/120 |
| 2010/0104928 | A1 | 4/2010 | Nishino et al. | |
| 2010/0236854 | A1* | 9/2010 | Nakamura | H01M 10/0468 |
| | | | | 180/68.5 |
| 2011/0177367 | A1* | 7/2011 | Chung | H01M 10/625 |
| | | | | 429/83 |
| 2011/0262791 | A1* | 10/2011 | Im | H01M 50/209 |
| | | | | 429/120 |
| 2014/0186677 | A1* | 7/2014 | Lim | H01M 10/6556 |
| | | | | 429/120 |
| 2015/0229010 | A1* | 8/2015 | Ahn | H01M 50/289 |
| | | | | 429/120 |
| 2016/0093929 | A1* | 3/2016 | Obasih | H01M 10/6551 |
| | | | | 429/120 |
| 2017/0069885 | A1* | 3/2017 | Zanoni | H01M 10/399 |
| 2017/0187083 | A1* | 6/2017 | Mueller | H01M 50/271 |
| 2018/0241017 | A1 | 8/2018 | Nakamura et al. | |
| 2020/0106067 | A1 | 4/2020 | Russell | |
| 2020/0313262 | A1* | 10/2020 | Suzuki | H01M 10/6557 |
| 2021/0066766 | A1* | 3/2021 | Gao | H01M 10/617 |
| 2021/0088690 | A1 | 3/2021 | Gondoh | |
| 2021/0234215 | A1* | 7/2021 | Nakahama | H01M 10/6556 |
| 2021/0249792 | A1 | 8/2021 | Lee et al. | |
| 2022/0029222 | A1 | 1/2022 | Lee | |
| 2022/0149478 | A1 | 5/2022 | Egashira et al. | |
| 2023/0344075 | A1* | 10/2023 | Lee | H01M 50/209 |
| 2024/0088515 | A1* | 3/2024 | Lee | H01M 10/625 |

FOREIGN PATENT DOCUMENTS

| | | | |
|---|---|---|---|
| EP | 3 944 359 | A1 | 1/2022 |
| JP | 2008-117766 | A | 5/2008 |
| JP | 2012-109126 | A | 6/2012 |
| JP | 2013-165013 | A | 8/2013 |
| JP | 2015-135763 | A | 7/2015 |
| JP | 2016-197551 | A | 11/2016 |
| JP | 2017-228496 | A | 12/2017 |
| JP | 2018-41651 | A | 3/2018 |
| KR | 10-2017-0069003 | A | 6/2017 |
| KR | 10-2020-0110081 | A | 9/2020 |
| KR | 10-2020-0141570 | A | 12/2020 |
| WO | WO 2017/073201 | A1 | 5/2017 |
| WO | WO2019/176415 | A1 | 9/2019 |
| WO | WO 2020/189965 | A1 | 9/2020 |
| WO | WO 2020/194966 | A1 | 10/2020 |

OTHER PUBLICATIONS

Extended European Search Report for European Application No. 22825172.4, dated Dec. 14, 2023.

* cited by examiner

【FIG. 1】
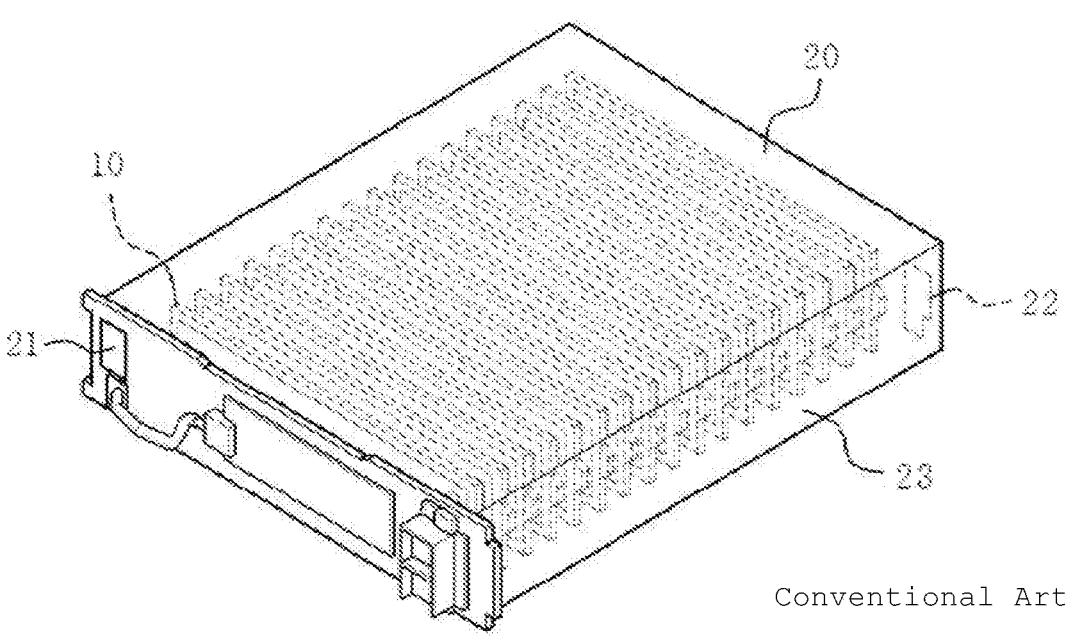
Conventional Art
【FIG. 2】
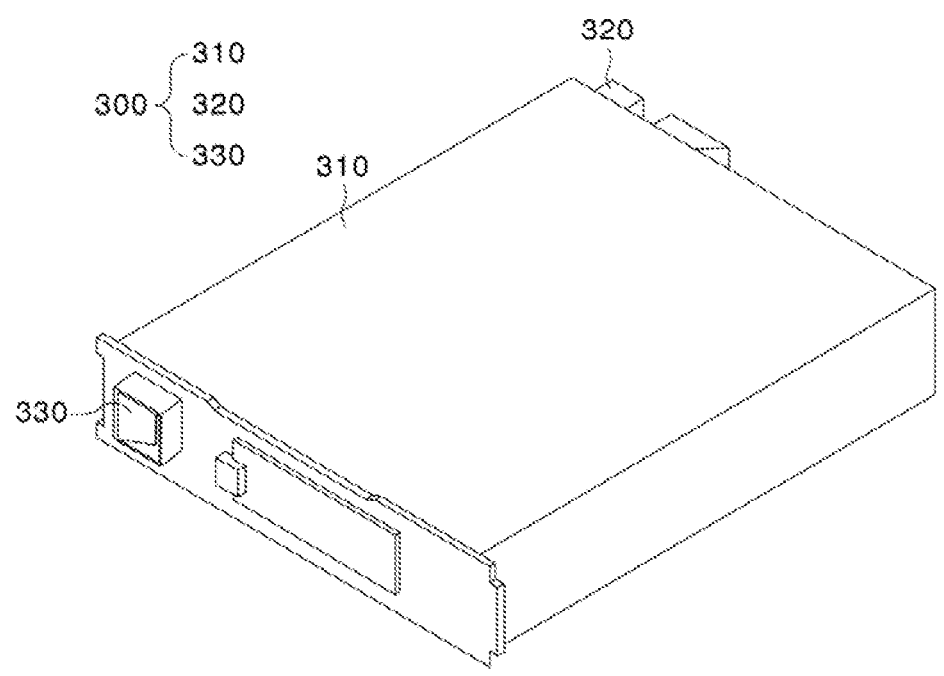

【FIG. 3】
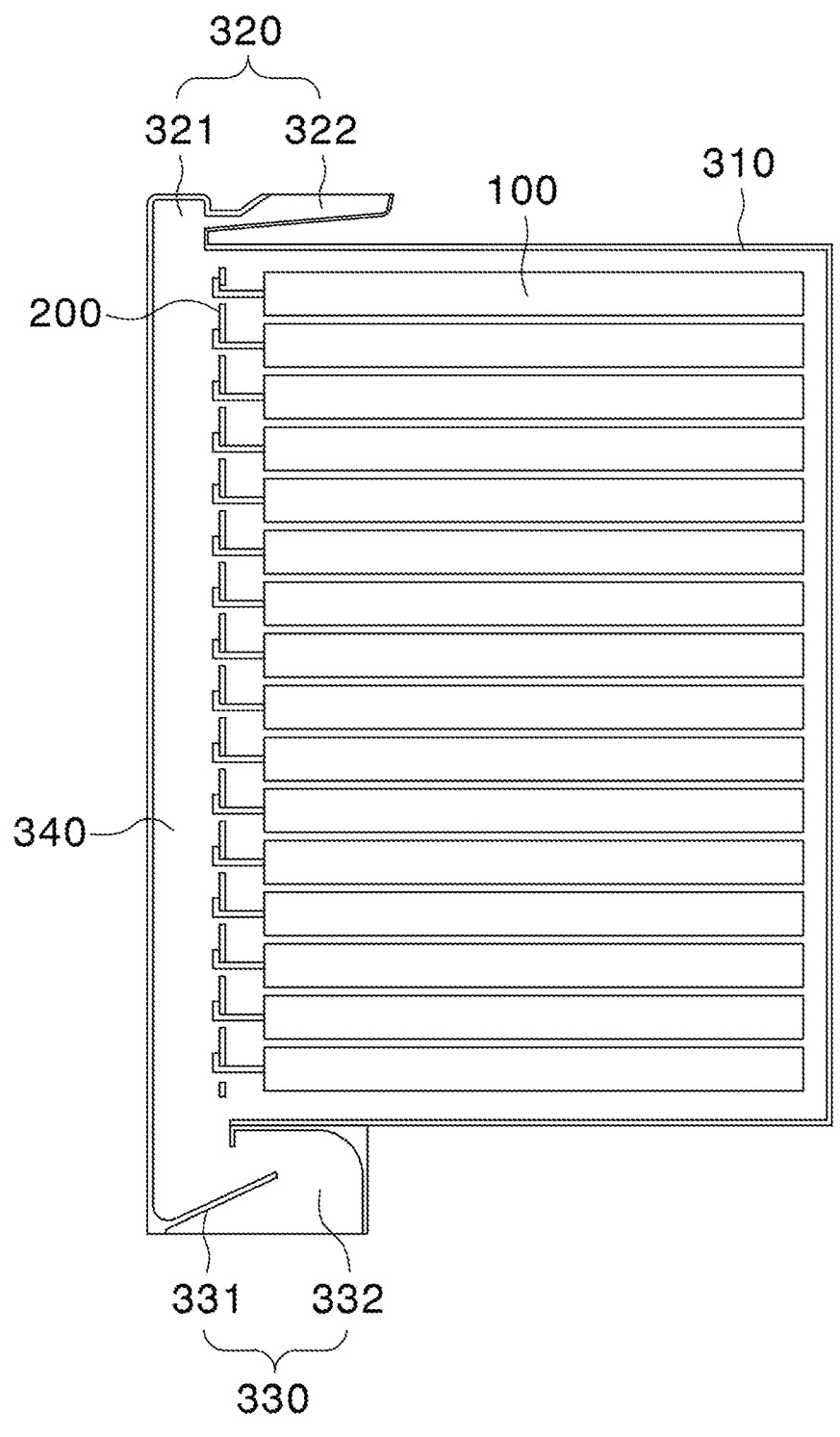

【FIG. 4】
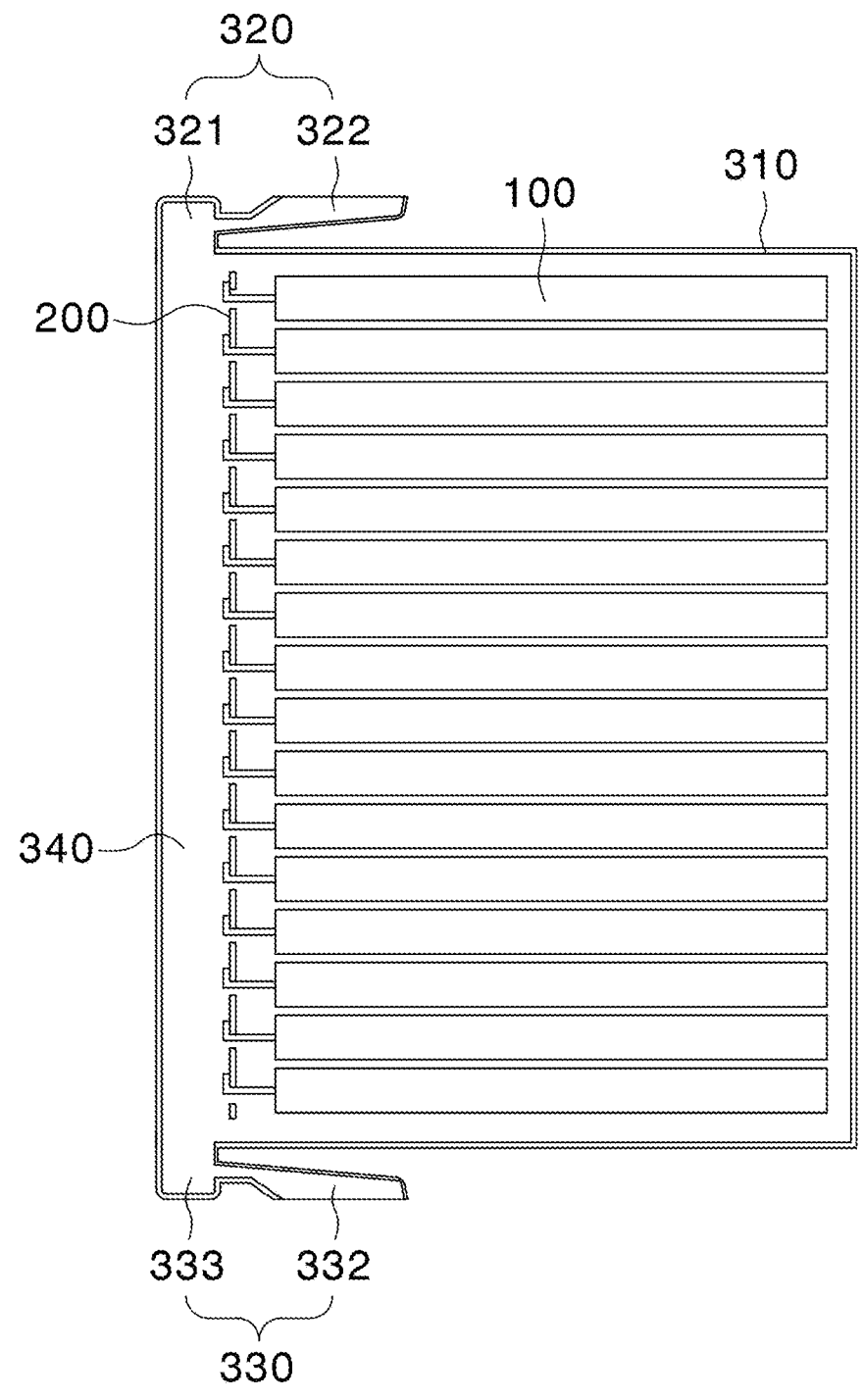

BATTERY MODULE HAVING BENT TRAP PORTION AND BATTERY PACK INCLUDING THE SAME

TECHNICAL FIELD

This application claims the benefit of priority to Korean Patent Application No. 2021-0077377 filed on Jun. 15, 2021, the disclosure of which is incorporated herein by reference in its entirety.

The present invention relates to a battery module having a bent trap portion and a battery pack including the same, and more particularly to a battery module having a bent trap portion capable of preventing high-temperature byproducts from being discharged to the outside when thermal runaway occurs in the battery module, whereby it is possible to inhibit secondary damage, and a battery pack including the same.

BACKGROUND ART

With recent development of alternative energies due to air pollution and energy depletion caused as the result of use of fossil fuels, demand for secondary batteries capable of storing electrical energy that is produced has increased. The secondary batteries, which are capable of being charged and discharged, are intimately used in daily life. For example, the secondary batteries are used in mobile devices, electric vehicles, and hybrid electric vehicles.

Required capacities of secondary batteries used as energy sources of various kinds of electronic devices inevitably used in modern society have been increased due to an increase in usage of mobile devices, increasing complexity of the mobile devices, and development of electric vehicles. In order to satisfy demand of users, a plurality of battery cells is disposed in a small-sized device, whereas a battery module including a plurality of battery cells electrically connected to each other or a battery pack including a plurality of battery modules is used in a vehicle.

When the secondary battery is used in a device that requires large capacity and high output, such as an electric vehicle, the secondary battery is used in the form of a battery module or a battery pack in which a plurality of battery cells is arranged.

Meanwhile, thermal runaway may occur in the battery cells received in the battery module due to overheating, and therefore it is necessary to cool the battery cells in the battery module. Thermal runaway and fire outbreak occurring in one battery cell are transferred to battery cells adjacent thereto, whereby high-temperature gas and byproducts are generated. At this time, fire may break out in a battery pack or a device in which the battery module is mounted while the high-temperature byproducts are discharged from the battery module, whereby secondary damage may occur.

In connection therewith, FIG. 1 is a perspective view of a conventional battery module. Referring to FIG. 1, the conventional battery module includes a plurality of stacked battery cells 10 and a module case 20 configured to receive the plurality of battery cells 10, and the module case 20 is provided with an air inlet 21, an air outlet 22, and an air circulation channel 23 configured to circulate air introduced into the module case in order to cool the battery cells 10 using the air.

In the conventional battery module, the battery cells 10 are cooled using the air, whereby an increase in temperature is inhibited. However, cooling is limited, whereby thermal runaway may occur. In addition, high-temperature byproducts and venting gas may be generated due to the thermal runaway. When the venting gas is discharged through the air inlet 21 and the air outlet 22, the high-temperature byproducts may also be discharged, whereby secondary fire outbreak may occur in a battery pack or a device in which the battery module is mounted.

PRIOR ART DOCUMENT (Patent Document 1) Korean Patent Application Publication No. 2020-0110081

DISCLOSURE

Technical Problem

The present invention has been made in view of the above problems, and it is an object of the present invention to provide a battery module having a bent trap portion capable of preventing high-temperature byproducts generated due to thermal runaway in the battery module from being discharged to the outside and a battery pack including the same.

It is another object of the present invention to provide a battery module having a bent trap portion capable of discharging venting gas generated in the battery module to the outside, whereby safety of the battery module is improved, and a battery pack including the same.

Technical Solution

In order to accomplish the above objects, a battery module having a bent trap portion according to the present invention includes a plurality of battery cells, a busbar configured to electrically connect the plurality of battery cells to each other, and a module case configured to receive the plurality of battery cells and the busbar, wherein the module case includes a receiving portion configured to define a predetermined space, a first trap portion configured to introduce air, a second trap portion configured to discharge air, and an air flow channel portion configured to allow the introduced air to move between the first trap portion and the second trap portion.

Also, in the battery module according to the present invention, the first trap portion may include a first pocket portion depressed outwardly to define a predetermined space and a first air circulation channel bent in a direction toward a side surface of the first pocket portion.

Also, in the battery module according to the present invention, the second trap portion may include a partition wall bent by a predetermined angle so as to define a predetermined space and a second air circulation channel formed in an "S" shape wall in the predetermined space by the partition wall.

Also, in the battery module according to the present invention, the first air circulation channel may have a gradually increasing width from an inlet to an outlet.

Also, in the battery module according to the present invention, the second trap portion may include a second pocket portion depressed outwardly to define a predetermined space and a second air circulation channel bent in a direction toward a side surface of the second pocket portion.

Also, in the battery module according to the present invention, the first air circulation channel may have a gradually increasing width from an inlet to an outlet.

Also, in the battery module according to the present invention, the second air circulation channel may have a gradually increasing width from an inlet to an outlet.

Also, in the battery module according to the present invention, the first trap portion may be formed at a first corner of the receiving portion.

Also, in the battery module according to the present invention, the second trap portion may be formed at a second corner of the receiving portion located in line with the first trap portion.

In addition, the present invention provides a battery pack including the battery module.

An outlet of the first air circulation channel may face away from the module case.

An outlet of the second air circulation channel may face away from the module case.

Advantageous Effects

As is apparent from the above description, a battery module having a bent trap portion according to the present invention and a battery pack including the same have an advantage in that it is possible to prevent high-temperature byproducts generated due to thermal runaway from being discharged from the battery module, whereby it is possible to inhibit secondary damage due to the byproducts.

In addition, the battery module having the bent trap portion according to the present invention and the battery pack including the same have an advantage in that it is possible to discharge venting gas to the outside while preventing the high-temperature byproducts from being discharged to the outside, whereby it is possible to prevent damage to the battery module due to swelling thereof, and therefore it is possible to improve safety of the battery module.

DESCRIPTION OF DRAWINGS

FIG. 1 is a perspective view of a conventional battery module.

FIG. 2 is a perspective view of a battery module according to a first preferred embodiment of the present invention.

FIG. 3 is a sectional view of the battery module shown in FIG. 2 taken in a horizontal direction.

FIG. 4 is a sectional view of a battery module according to a second preferred embodiment of the present invention taken in a horizontal direction.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the entire specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery module having a bent trap portion according to the present invention and a battery pack including the same will be described with reference to the accompanying drawings.

FIG. 2 is a perspective view of a battery module according to a first preferred embodiment of the present invention, and FIG. 3 is a sectional view of the battery module shown in FIG. 2 taken in a horizontal direction.

Referring to FIGS. 2 and 3, the battery module according to the first preferred embodiment of the present invention includes battery cells 100, a busbar 200, and a module case 300.

First, each of the battery cells 100 includes a cell assembly, a cell case configured to receive the cell assembly, and a pair of leads.

The cell assembly may be a jelly-roll type cell assembly, which is configured to have a structure in which a long sheet type positive electrode and a long sheet type negative electrode are wound in the state in which a separator is interposed therebetween, a stacked type cell assembly constituted by unit cells, each of which is configured to have a structure in which a rectangular positive electrode and a rectangular negative electrode are stacked in the state in which a separator is interposed therebetween, a stacked and folded type cell assembly, which is configured to have a structure in which unit cells are wound using a long separation film, or a laminated and stacked type cell assembly, which is configured to have a structure in which unit cells are stacked in the state in which a separator is interposed therebetween and are then attached to each other. However, the present invention is not limited thereto.

The cell assembly is mounted in the cell case, and the cell case is generally configured to have a laminate sheet structure including an inner layer, a metal layer, and an outer layer. The inner layer is disposed in direct contact with the cell assembly, and therefore the inner layer must exhibit high insulation properties and high resistance to an electrolytic solution. In addition, the inner layer must exhibit high sealability in order to hermetically seal the cell case from the outside, i.e. a thermally-bonded sealed portion between inner layers must exhibit excellent thermal bonding strength. The inner layer may be made of a material selected from among a polyolefin-based resin, such as polypropylene, polyethylene, polyethylene acrylate, or polybutylene, a polyurethane resin, and a polyimide resin, which exhibit excellent chemical resistance and high sealability. However, the present invention is not limited thereto, and polypropylene, which exhibits excellent mechanical-physical properties, such as tensile strength, rigidity, surface hardness, and impact resistance, and excellent chemical resistance, is most preferably used.

The metal layer, which is disposed so as to abut the inner layer, corresponds to a barrier layer configured to prevent moisture or various kinds of gas from permeating into the battery from the outside. An aluminum thin film, which is lightweight and easily shapeable, may be used as a preferred material for the metal layer.

The outer layer is provided on the other surface of the metal layer. The outer layer may be made of a heat-resistant polymer that exhibits excellent tensile strength, resistance to moisture permeation, and resistance to air transmission such that the outer layer exhibits high heat resistance and chemical resistance while protecting the cell assembly. As an example, the outer layer may be made of nylon or polyethylene terephthalate. However, the present invention is not limited thereto.

Meanwhile, the leads, which include a positive electrode lead and a negative electrode lead, are electrically connected to a positive electrode tab and a negative electrode tab of the cell assembly, respectively, and are exposed outwards from the case. The battery cell corresponds to generally known constructions, and therefore a more detailed description thereof will be omitted.

The busbar 200 connects positive electrode leads and negative electrode leads protruding and extending from the plurality of stacked battery cells 100 to each other in series or in parallel. For bidirectional battery cells 100, the busbar is provided at each of a front surface and a rear surface of the battery module. For unidirectional battery cells 100, the busbar is provided at only one of the front surface and the rear surface of the battery module.

Next, the module case 300 includes a receiving portion 310, a first trap portion 320, a second trap portion 330, and an air flow channel portion 340.

The receiving portion 310, which is configured to receive the plurality of stacked battery cells 100, includes a flat-shaped lower cover, a side plate extending perpendicular from an edge of the lower cover, and an upper cover configured to cover upper parts of the plurality of stacked battery cells 100. The receiving portion protects the battery cells 100 from external foreign matter and impact.

The first trap portion 320 is formed at a corner part of one side of the receiving portion 310, and includes a first pocket portion 321 depressed by a predetermined depth in an outward direction and a first air circulation channel 322 configured to allow air to be introduced into the battery module therethrough.

Although the first air circulation channel 322 is used as an air introduction passage, the first air circulation channel may be used as an air discharge passage.

The first pocket 321 is depressed by the predetermined depth to define a predetermined space, and the first air circulation channel 322 is formed so as to be bent by a predetermined angle in a direction toward a side surface of the first pocket portion 321. When venting gas and high-temperature byproducts are generated due to thermal runaway in the battery cells 100 and the venting gas and the byproducts are discharged from the battery module, therefore, the byproducts are accumulated in the predetermined space of the first pocket portion 321, and the venting gas is discharged to the outside along the first air circulation channel 322, which is bent by the predetermined angle, whereby there is an advantage in that it is possible to prevent secondary damage due to the high-temperature byproducts.

The first air circulation channel 322 is formed in a funnel shape having a width gradually increasing from an inside to an outside thereof, whereby air may be more easily introduced, and an inner passage of the first air circulation channel is narrow, whereby it is possible to inhibit discharge of the byproducts to the outside.

The second trap portion 330 is formed at a corner part of the receiving portion 310 located in line with the first trap portion 320, and includes a partition wall 331 and a second air circulation channel 332 configured to allow air to be discharged from the battery module therethrough.

Although the first trap portion 320 and the second trap portion 330 are located on the same straight line for smoother air circulation, the positions of the first trap portion and the second trap portion are not restricted as long as the battery cells 100 can be cooled by introduced air. For example, the first trap portion and the second trap portion may be disposed in a diagonal direction.

Although the second air circulation channel 332 is used as an air discharge passage, the second air circulation channel may be used as an air introduction passage.

The partition wall 331 is formed inside the second trap portion 330 in a flat shape having a predetermined angle from the side plate of the receiving portion 310, and a predetermined space is defined between the side plate and the partition wall 331.

Since the partition wall 331 is formed so as to have the predetermined angle, the second air circulation channel 332 is bent by a predetermined angle so as to have an "S" shape. When byproducts and venting gas generated due to thermal runaway in the battery cells 100 are discharged from the battery cells 100, therefore, the byproducts are accumulated in the predetermined space defined between the side plate and the partition wall 331, and the venting gas separated from the byproducts is discharged along the "S"-shaped second air circulation channel 332, whereby there are advantages in that it is possible to prevent fire outbreak due to the byproducts and to prevent damage to the battery module due to swelling caused by the venting gas.

The air flow channel portion 340, which is a space defined as the result of the battery cells 100 received in the receiving portion 310 being spaced apart from the side plate, to which the first trap portion 320 and the second trap portion 330 are connected, by a predetermined distance, is a passage configured to allow air that is introduced through the first trap portion 320 or the second trap portion 330 and cools the plurality of battery cells 100 to move therealong.

FIG. 4 is a sectional view of a battery module according to a second preferred embodiment of the present invention taken in a horizontal direction.

Referring to FIG. 4, the battery module according to the second preferred embodiment of the present invention is identical in construction to the battery module according to the first preferred embodiment of the present invention described with reference to FIGS. 2 and 3 except for the second trap portion 330, and therefore a description of the same construction will be omitted.

The second trap portion 330 of the battery module according to the second preferred embodiment of the present invention includes a second pocket portion 333 depressed by a predetermined depth in an outward direction and a second air circulation channel 332 configured to allow air to be discharged from the battery module therethrough.

Although the second air circulation channel 332 is used as an air discharge passage, as previously described, the second air circulation channel may be used as an air introduction passage.

The second pocket portion 333 is depressed by the predetermined depth to define a predetermined space, in the same manner as the first pocket portion 321, and the second air circulation channel 332 is formed so as to be bent by a predetermined angle in a direction toward a side surface of the second pocket portion 333. When venting gas and high-temperature byproducts are generated due to thermal runaway in the battery cells 100 and the venting gas and the byproducts are discharged from the battery module, therefore, the byproducts are accumulated in the second pocket portion 333, and the venting gas is discharged to the outside along the second air circulation channel 332, which is bent by the predetermined angle, whereby there is an advantage in that it is possible to prevent secondary fire outbreak due to the high-temperature byproducts.

In addition, the second air circulation channel 332 is formed in a funnel shape having a width gradually increasing from an inside to an outside thereof, whereby air may be more easily introduced, and an inner passage of the second air circulation channel is narrow, whereby it is possible to inhibit discharge of the byproducts to the outside.

The present invention provides a battery pack including a battery module having at least one of the features described above, and the battery pack may be mounted in a device, such as an electric vehicle, a hybrid electric vehicle, or a plug-in hybrid electric vehicle.

Those skilled in the art to which the present invention pertains will appreciate that various applications and modifications are possible within the category of the present invention based on the above description.

DESCRIPTION OF REFERENCE NUMERALS

100: Battery cell
200: Busbar
300: Module case
310: Receiving portion
320: First trap portion
321: First pocket portion
322: First air circulation channel
330: Second trap portion
331: Partition wall
332: Second air circulation channel
333: Second pocket portion
340: Air flow channel portion

The invention claimed is:

1. A battery module comprising:
   a plurality of battery cells;
   a busbar configured to electrically connect the plurality of battery cells to each other; and
   a module case configured to receive the plurality of battery cells and the busbar,
   wherein the module case comprises:
      a receiving portion configured to define a predetermined space formed by a front wall, a rear wall, a first side wall extending from the front wall to the rear wall and a second side wall extending from the front wall to the rear wall;
      a first trap portion configured to introduce air at a first end of the front wall and extending rearwardly from the front wall;
      a second trap portion configured to discharge air at a second end of the front wall and extending rearwardly from the front wall; and
      an air flow channel portion configured to allow the introduced air to move between the first trap portion and the second trap portion.

2. The battery module according to claim 1, wherein the first trap portion comprises:
   a first pocket portion depressed outwardly relative to the first side wall to define a predetermined space; and a first air circulation channel bent in a direction toward a side surface of the first pocket portion.

3. The battery module according to claim 2, wherein the second trap portion comprises:
   a partition wall bent by a predetermined angle so as to define a predetermined space; and
   a second air circulation channel formed in an "S" shape wall in the predetermined space by the partition wall.

4. The battery module according to claim 3, wherein the first air circulation channel has a continuously increasing width from an inlet to an outlet.

5. The battery module according to claim 3, wherein the partition wall extends rearwardly and inwardly from an end of the front wall.

6. The battery module according to claim 2, wherein the second trap portion comprises:
   a second pocket portion depressed outwardly to define a predetermined space; and
   a second air circulation channel bent in a direction toward a side surface of the second pocket portion.

7. The battery module according to claim 6, wherein the first air circulation channel has a continuously increasing width from an inlet to an outlet.

8. The battery module according to claim 6, wherein the second air circulation channel has a continuously width increasing from an inlet to an outlet.

9. The battery module according to claim 8, wherein an outlet of the second air circulation channel faces away from the module case.

10. The battery module according to claim 2, wherein an outlet of the first air circulation channel faces away from the module case.

11. The battery module according to claim 1, wherein the first trap portion is formed at a first corner of the receiving portion.

12. The battery module according to claim 11, wherein the second trap portion is formed at a second corner of the receiving portion located in line with the first trap portion.

13. A battery pack comprising the battery module according to claim 1.

14. The battery module according to claim 1, wherein the first trap portion is spaced from the first side wall, and wherein the second trap portion is spaced from the second side wall.

15. The battery module according to claim 1, wherein the first trap portion and the second trap portion are outside the receiving portion.

16. The battery module according to claim 1, wherein a length of the front wall is greater than a length of the rear wall.

17. The battery module according to claim 1, wherein the air flow channel portion is between the front wall and the plurality of battery cells and extends along an entire length of the front wall.

* * * * *